(12) United States Patent
Michael

(10) Patent No.: US 10,844,903 B2
(45) Date of Patent: Nov. 24, 2020

(54) SPHERICAL ROLLER BEARING

(71) Applicant: AKTIEBOLAGET SKF, Gothenburg (SE)

(72) Inventor: Benjamin Michael, Werneck (DE)

(73) Assignee: Aktiebolaget SKF, Gothenburg (SE)

( * ) Notice: Subject to any disclaimer, the term of this patent is extended or adjusted under 35 U.S.C. 154(b) by 685 days.

(21) Appl. No.: 15/128,006

(22) PCT Filed: Mar. 20, 2015

(86) PCT No.: PCT/EP2015/055915
§ 371 (c)(1),
(2) Date: Sep. 21, 2016

(87) PCT Pub. No.: WO2015/144580
PCT Pub. Date: Oct. 1, 2015

(65) Prior Publication Data
US 2017/0108036 A1  Apr. 20, 2017

(30) Foreign Application Priority Data
Mar. 28, 2014 (DE) .................. 10 2014 205 812

(51) Int. Cl.
| | |
|---|---|
| *F16C 23/08* | (2006.01) |
| *F16C 33/58* | (2006.01) |
| *F16C 19/54* | (2006.01) |
| *B21D 11/20* | (2006.01) |
| *F16C 19/38* | (2006.01) |

(52) U.S. Cl.
CPC .......... *F16C 23/086* (2013.01); *B21D 11/203* (2013.01); *F16C 19/546* (2013.01); *F16C 19/547* (2013.01); *F16C 33/58* (2013.01); *F16C 19/38* (2013.01); *F16C 2322/12* (2013.01)

(58) Field of Classification Search
CPC ...... F16C 19/38; F16C 19/546; F16C 19/547; F16C 23/082; F16C 23/084; F16C 23/086; F16C 33/58; F16C 2322/12; B21D 11/203
See application file for complete search history.

(56) References Cited

U.S. PATENT DOCUMENTS

| | | | | |
|---|---|---|---|---|
| 1,234,779 A | * | 7/1917 | Ljungberg | ............ F16C 23/086 |
| | | | | 384/497 |
| 1,319,794 A | * | 10/1919 | Pruyn | ................... F16C 19/188 |
| | | | | 384/453 |
| 1,548,821 A | | 8/1925 | Bronander | |
| 1,585,690 A | | 5/1926 | Pratt | |
| 1,862,641 A | | 6/1932 | Turner | |
| 1,982,899 A | | 12/1934 | Buckwalter | |

(Continued)

FOREIGN PATENT DOCUMENTS

| | | |
|---|---|---|
| DE | 2912544 A1 | 10/1979 |
| DE | 19964390 B4 | 3/2006 |

(Continued)

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A spherical roller bearing includes at least one outer ring and one inner ring and at least one rolling element disposed between the at least one outer ring and the one inner ring. The outer ring is axially enlarged with respect to the inner ring in a one-sided manner on a load-zone side of the spherical roller bearing.

14 Claims, 3 Drawing Sheets

(56) References Cited

U.S. PATENT DOCUMENTS

| | | | | |
|---|---|---|---|---|
| 2,822,225 A | | 2/1958 | Teufel | |
| 3,704,616 A | * | 12/1972 | Taira | B21D 7/08 72/167 |
| 4,008,595 A | * | 2/1977 | Allenspach | B21D 7/08 72/170 |
| 4,227,754 A | * | 10/1980 | Kellstrom | F16C 23/086 384/450 |
| 2014/0079350 A1 | * | 3/2014 | Rink | F16C 23/086 384/497 |

FOREIGN PATENT DOCUMENTS

| | | | | |
|---|---|---|---|---|
| GB | 703566 A | | 2/1954 | |
| JP | H02186120 A | | 7/1990 | |
| JP | 2002323039 A | * | 11/2002 | F16C 23/086 |
| JP | 2012067868 A | * | 4/2012 | F16C 23/086 |

* cited by examiner

SPHERICAL ROLLER BEARING

CROSS-REFERENCE

This application is the U.S. National Stage of International Application No. PCT/EP2015/055915 filed on Mar. 20, 2015, which claims priority to German patent application no. 10 2014 205 812.0 filed on Mar. 28, 2014.

TECHNOLOGICAL FIELD

The present invention relates to a spherical roller bearing including at least one outer ring and one inner ring, between which at least one rolling element is disposed, as well as a spherical roller bearing assembly and a roller bending machine.

BACKGROUND

Spherical roller bearings are special rolling-element bearings that in comparison to other bearing designs maintain relatively high axial and radial loads and are suited for compensating for misalignment. Spherical roller bearings are thus suited in particular for use in a roller bearing assembly of roller bending machines whose rollers bend steel plates having enormous weights of up to over 100 t into tubes at room temperature. Here the spherical roller bearing usually includes an inner ring and an outer ring, between which double row rolling elements are disposed. Spherical roller bearings here, like the single-row-designed barrel roller bearing, are slightly self-aligning. Here the self-alignability of the bearing decreases significantly with increasing load of the bearing so that a shaft supported by a spherical roller bearing can often only be inclined approximately 0.5° with respect to its central position. However, with the above-mentioned roller bending machines it is desirable at times to also bend conical elements, as required, for example, for tower elements of wind turbines, wherein at least one of the rollers of the roller bending machine must be inclined. However, a significant inclination of, for example, a plurality of degrees as required therefor, cannot be provided by the known spherical roller bearings.

The reason for this is that with such an inclination the rolling elements swivel out with respect to the outer ring, which can be absorbed and tolerated by the bearing up to a slight inclination. Nevertheless the inclination and the associated swiveling-out, in particular with a heavy load of the bearing, leads to a very high wear of the bearing rings and/or of the rolling elements so that a complete replacement of the bearing is necessary to a heightened degree.

Alternatively, tapered roller bearings can also be used if an inclination of the shaft is necessary. However, with such bearings the housing must make possible a tilting of the shaft, which is only possible under great effort and can in turn lead to damage to the bearing.

SUMMARY

The object of the present invention is therefore to provide a spherical roller bearing, using which a significant inclination of the shaft to be supported is possible even with an expected high load of the bearing.

According to the invention a spherical roller bearing is provided including at least one outer ring and one inner ring, between which at least one rolling element is disposed. Here the invention is based on the idea to make possible an inclination of the shaft from its central position such that the outer ring is axially enlarged compared to the inner ring. Due to the axial enlargement, even with misalignment the rolling elements can be guided axially along a larger surface so that a swiveling-out and snapping-out of the rolling-element set from the bearing is reliably prevented.

Here an extent of the enlargement is preferably determined by the inclination to be provided of the shaft to be supported. If, for example, an inclination of a plurality of degrees is to be achieved, then the required enlargement of the outer ring can be calculated accordingly.

According to a further advantageous exemplary embodiment the outer ring is axially enlarged less than 20%, preferably less than 10%, compared to the inner ring. A significant inclination of the to-be-supported shaft can thereby already be achieved without excessively enlarging the bearing or running the risk that the bearing is damaged due to the changed physical force transmission, in particular due to the greater weight force acting one-side on the bearing. For special applications, for example, with a tilt between 2° and 4°, even a percentage enlargement of less than 10% is needed. As mentioned above, the enlargement of the outer ring can be determined and set via the expected tilt of the shaft to be supported.

According to a further advantageous exemplary embodiment the axial enlargement of the outer ring is configured asymmetric with respect to the inner ring. Here it is advantageous in particular if the axial enlargement of the outer ring is configured essentially one-sided. Due to the asymmetric, in particular the one-sided configuration of the axial enlargement it is still possible to arrange and to install the rolling elements in a cage. A two-sided enlargement would hinder or even prevent such a cage-installation, since in this case the inner diameter of the outer ring would be smaller than the outer diameter of the inner ring plus rolling elements. The outer ring would thereby impinge on the rolling-element set, which in turn prevents assembly.

With a tilt of the shaft the bearing is usually more heavily loaded on one side, in the so-called load zone, than on the side facing away from the load zone. It is therefore preferred to arrange the essentially one-side axial enlargement of the outer ring on the load-zone side of the rolling-element bearing. The rolling-element set can thereby be supported by the inventive enlarged outer ring even with a significant incline of the to-be-supported shaft. A swiveling-out of the rolling-element set from the bearing and an associated disproportionately greater wear of the rolling elements or even a snapping-out of the rolling elements from the bearing can thus be reliably avoided. In contrast, the swiveling-out of the rolling elements from the bearing on the unloaded side represents no problem since the rolling elements are guided unloaded on this side and are thus not subject to increased wear.

A further aspect of the present invention relates to a spherical roller bearing for supporting a shaft, wherein a first above-described spherical roller bearing is formed on a first end of the shaft, and a second above-described spherical roller bearing on a second end. A tilt of the shaft can thereby be made possible without having to take into account losses of the axial and radial loadability of the bearing.

As a further aspect of the present invention shows this is advantageous in particular in roller bending machines wherein high radial and axial forces act on the spherical roller bearings supporting the rollers, but at the same time an inclination of at least one of the rollers is desired in order to also be able to manufacture conical profiles.

Another aspect of the disclosure comprises a spherical roller bearing having an outer ring having a first axial side and a second axial side, an inner ring having a first axial side and a second axial side, and at least one rolling element disposed between the outer ring and the inner ring. The first axial side of the outer ring and the first axial side of the inner ring are axially aligned, and a distance between the first axial side of the outer ring and the second axial side of the outer ring is greater than a distance between the first axial side of the inner ring and the second axial side of the inner ring on a load-zone side of the spherical roller bearing.

Further advantages and advantageous designs are defined in the description, the drawings, and the dependent claims.

In the following the invention shall be described in more detail with reference to the exemplary embodiments depicted in the drawings. Here the exemplary embodiments are of a purely exemplary nature and are not intended to establish the scope of the application. This scope is defined solely by the appended claims.

DETAILED DESCRIPTION

In the following, identical or functionally equivalent elements are designated by the same reference numbers.

Figure 1:
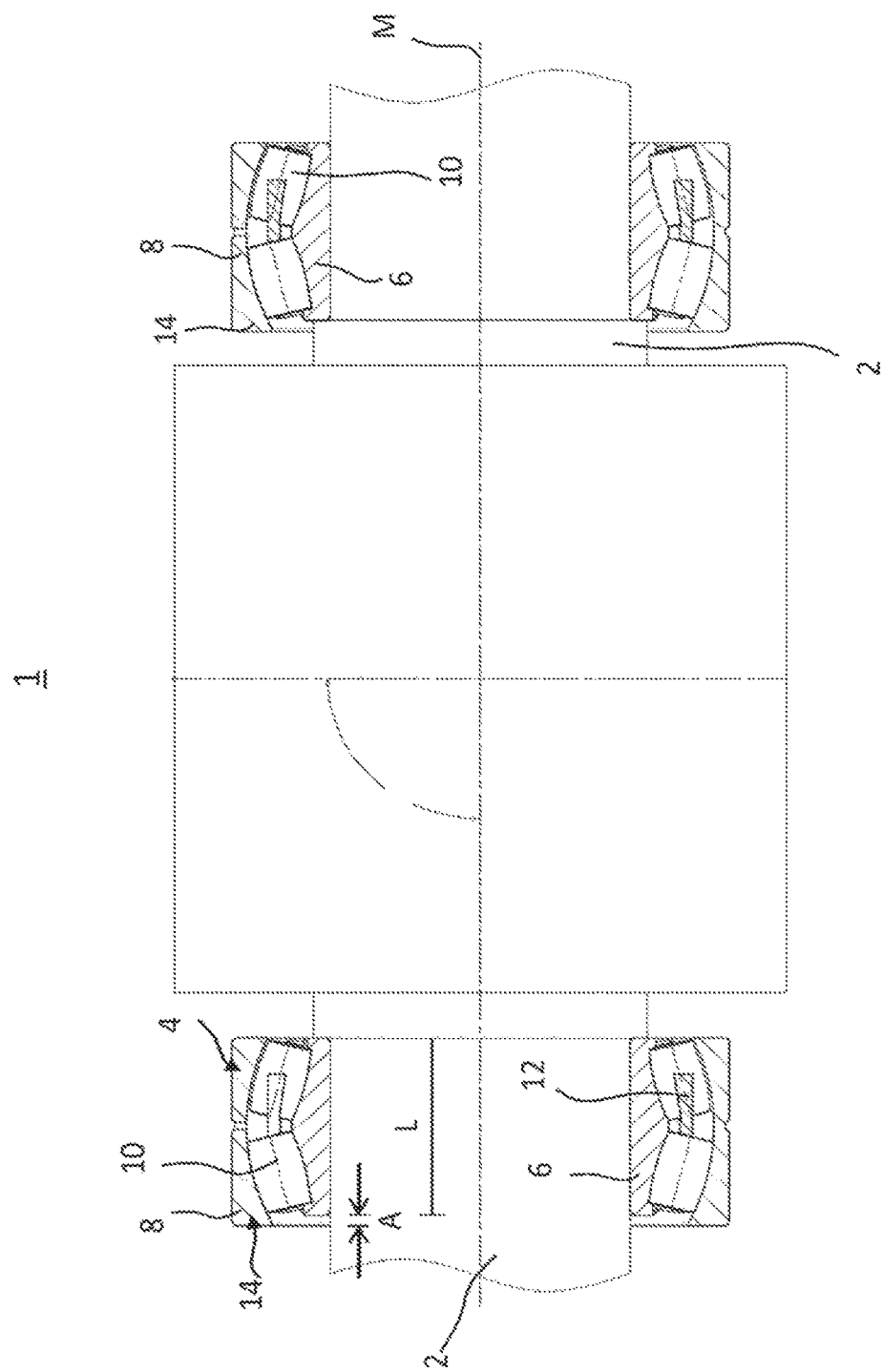
FIG. 1 shows a schematic depiction of a first exemplary embodiment of the inventive bearing assembly with centrally disposed shaft.

FIG. 1 schematically shows a bearing assembly 1 with shaft 2 received therein. Here the bearing assembly 1 includes a first and a second spherical roller bearing 4, which each include an inner ring 6 that is connected to the shaft 2 so as to rotate therewith. Rolling elements 10 are disposed between the inner rings 6 and outer rings 8 of the spherical roller bearing 4, which rolling elements have a characteristic shape for a spherical roller bearing 4. Furthermore, it can be seen from FIG. 1 that the rolling elements 10 are received in a known manner by a double-chamber cage 12 and secured in their position with respect to one another.

Figure 3:
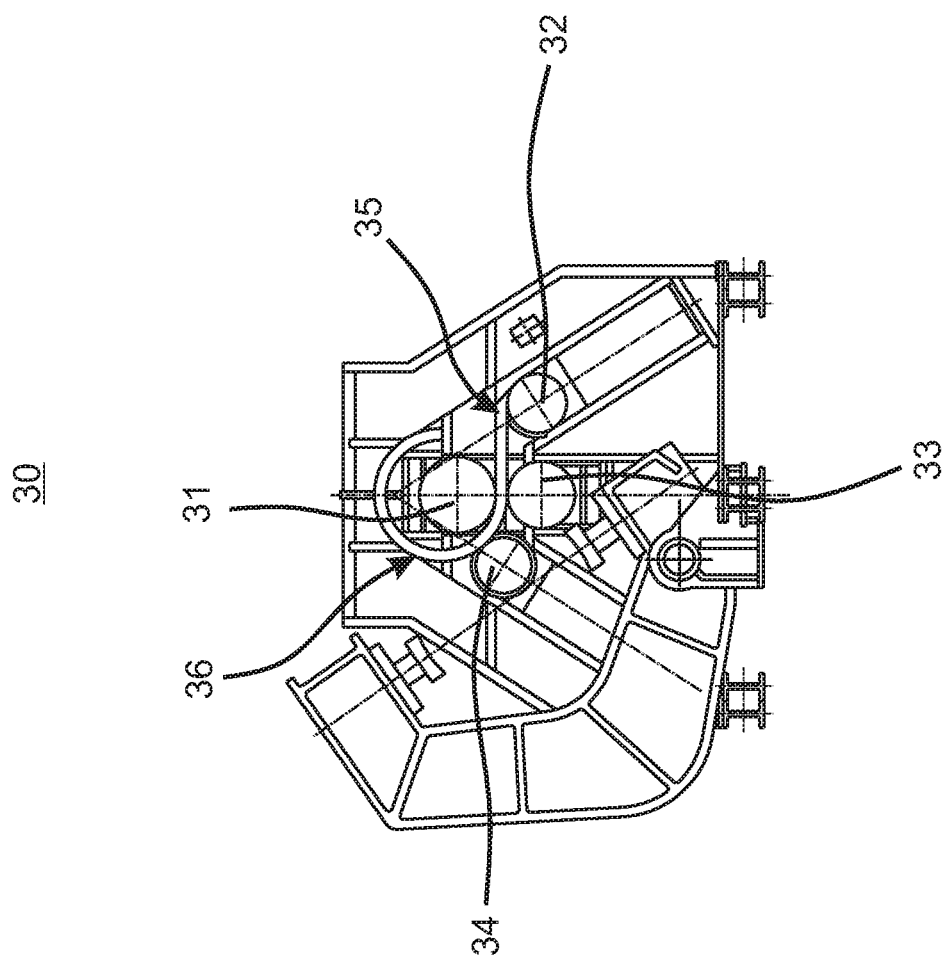
FIG. 3 shows a schematic sectional view through a roller bending machine with rollers supported using the spherical roller bearings shown in FIGS. 1 and 2.

Shafts 2 supported in this way preferably find their use in roller bending machines. Such a roller bending machine is schematically depicted in FIG. 3. It usually includes 3, or, as depicted, 4, rollers 31, 32, 33, 34 that can be arranged and moved with respect to one another so as to bend a tubular element 36 from a plate-shaped element 35. Such machines 30 here can bend steel plates having a weight of up to well over 100 t into tubes at room temperature. In order to be able to support the enormous forces acting here, the rollers 31-34 are supported by the spherical roller bearings 4 shown in FIG. 1. Here the specific design of the spherical roller bearing 4 described in the following also makes possible an inclination of the rollers so that conical profiles, for example, for a tower element of a wind turbine, can also be formed.

Here FIG. 1 shows that the outer ring 8 has a greater axial extension A on one-side in a region 14 than the inner ring 6, wherein the extent of the axial enlargement A is adapted to an expected inclination of the shaft 2 and is dimensioned accordingly. This means, for example, that there is an axial enlargement of less than 20% of the entire axial length L of the inner ring, preferably less than 10% of the axial length L of the inner ring.

Figure 2:
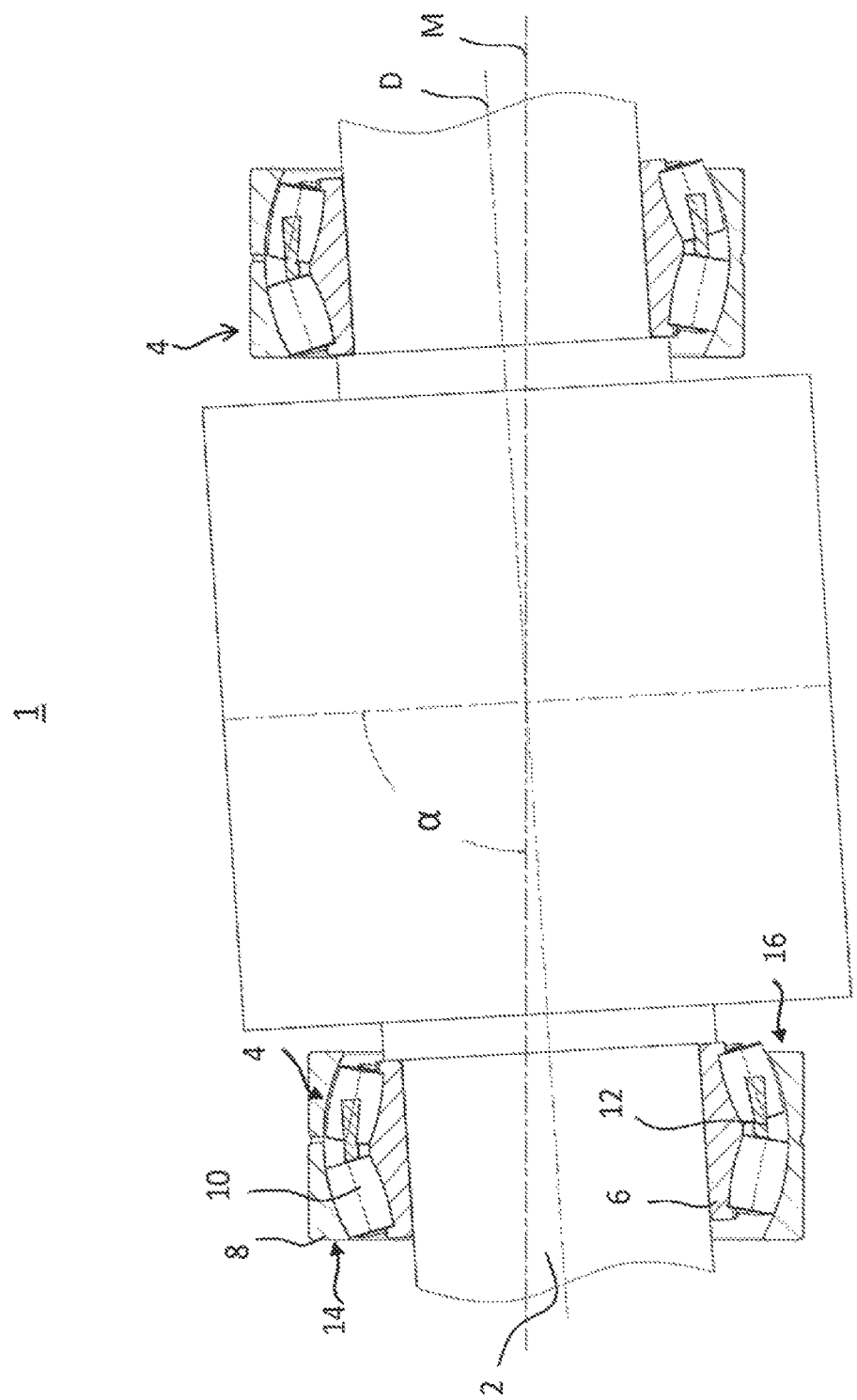
FIG. 2 shows a schematic depiction of the bearing assembly depicted in FIG. 1 with inclined shaft.

If, for example, an inclination of 2° to 4°, as depicted in FIG. 2, of the shaft 2 is achieved, then even an axial enlargement of less than 10% would be sufficient to ensure such a inclination.

As mentioned such an inclination of the shaft 2 in the rolling-element bearings 4 is schematically depicted in FIG. 2. Here the axis of rotation D of the shaft 2 is inclined by an angle α with respect to a central axis M of the rolling-element bearing 4. As can further be seen from FIG. 2, this inclination can be achieved with the inventive rolling-element bearings 4 such that the rolling elements 10 move in the enlarged region A of the outer ring 8 and are further contacted by it and guided in the load-zone region 14. On the one hand wear is thereby minimized, and on the other handed it is prevented that the rolling elements 10 can be pushed out of the bearing 4.

In contrast, on the unloaded side 16 of the rolling-element bearing 4 the rolling elements 10 come out of the outer rings 8 and are no longer completely contacted and guided. However, since on this side 16 no or only a slight load occurs, no excessive wear occurs on the rolling elements 10. In addition, a snapping-out of the rolling elements 10 from the rolling-element bearing 4 can be prevented by the load-supporting of the region 14 and the enlargement provided via the enlarged region A of the outer ring. Due to the one-side design of the enlargement, the rolling-element bearing 4 simultaneously remains installable in its usual form with bearing cage.

Overall, due to the preferably one-sided axial enlargement of the outer ring of the inventive rolling-element bearing it can be achieved that a significant tilting of the shaft is possible even with large loads that occur, for example, in the use in a roller bending machine, without a too-great wear of the rolling elements or a too-great swiveling-out and thus snapping-out of the rolling elements from the bearing rings being expected or being feared.

REFERENCE NUMBER LIST

1 Bearing assembly
2 Shaft
4 Rolling-element bearing
6 Inner ring
8 Outer ring
10 Rolling elements
12 Bearing cage
14 Load zone
16 Unloaded region
30 Roller bending machine
31, 32, 33, 34 Rollers
35 Plate-shaped element
36 Tubular element
A Axial enlargement
L Axial length of the inner ring
D Axis of rotation
M Center axis

The invention claimed is:

1. A spherical roller bearing comprising:
an outer ring;
an inner ring;
two rows of rolling elements are axially disposed adjacent to each other between the outer ring and the inner ring, wherein the two rows of rolling elements roll on the outer ring and the inner ring, wherein the outer ring is axially enlarged with respect to the inner ring and the axial enlargement of the outer ring is one-sided and located on a load-zone side of the spherical roller bearing, the inner ring being located on a shaft, the outer ring being an outermost ring of the spherical roller bearing and being angularly rotatable relative to the inner ring, a portion of the outer ring which forms the axial enlargement forming part of a raceway of the outer ring for at least one of the two rows of rolling elements to roll thereover.

2. The spherical roller bearing according to claim 1, wherein the outer ring is axially enlarged with respect to the inner ring by less than twenty percent (20%).

3. A spherical roller bearing assembly for supporting a shaft that includes the spherical roller bearing of claim 1 that is disposed on a first end of the shaft, and another of the spherical roller bearing of claim 1 on a second end of the shaft.

4. A roller bending machine for manufacturing tubular elements, comprising a roller that is supported by the spherical roller bearing assembly according to claim 3.

5. The spherical roller bearing according to claim 1, wherein the outer ring is axially enlarged with respect to the inner ring by less than ten percent (10%).

6. The spherical roller bearing according to claim 1, wherein the at least one outer ring has a first axial side and a second axial side and wherein the one inner ring has a first axial side and a second axial side, and wherein the first axial side of the at least one outer ring is axially aligned with the first axial side of the one inner ring.

7. The spherical roller bearing according to claim 6, wherein the outer ring is axially enlarged with respect to the inner ring by less than twenty percent (20%).

8. The spherical roller bearing according to claim 6, wherein the outer ring is axially enlarged with respect to the inner ring by less than ten percent (10%).

9. A spherical roller bearing comprising:
an outer ring having a first axial side and a second axial side;
an inner ring having a first axial side and a second axial side; and
two rows of rolling elements axially disposed between the outer ring and the inner ring adjacent to each other,
wherein the rolling elements roll on the outer ring and the inner ring,
wherein the first axial side of the outer ring and the first axial side of the inner ring are axially aligned, and
wherein a distance between the first axial side of the outer ring and the second axial side of the outer ring is greater than a distance between the first axial side of the inner ring and the second axial side of the inner ring on a load-zone side of the spherical roller bearing so as to create an axially enlarged section on the outer ring relative to the inner ring, the inner ring being located on the a shaft, the outer ring being an outermost ring of the spherical roller bearing and being angularly rotatable relative to the inner ring, the axially enlarged section forming part of a raceway of the outer ring for at least one of the two rows of rolling elements to roll thereover.

10. The spherical roller bearing according to claim 9, wherein the distance between the first axial side of the outer ring and the second axial side of the outer ring is greater than the distance between the first axial side of the inner ring and the second axial side of the inner ring by less than twenty percent (20%).

11. The spherical roller bearing according to claim 9, wherein the distance between the first axial side of the outer ring and the second axial side of the outer ring is greater than the distance between the first axial side of the inner ring and the second axial side of the inner ring by less than ten percent (10%).

12. A spherical roller bearing including an outer ring and an inner ring, between which two rows of rolling elements are axially disposed adjacent to each other with a portion of a cage therebetween, wherein the two rows of rolling elements roll on the outer ring and the inner ring, wherein the outer ring is axially enlarged with respect to the inner ring and the axial enlargement of the outer ring is one-sided and located on a load-zone side of the spherical roller bearing, wherein one of the two rows of rolling elements which is located on an unloaded side of the spherical roller bearing can axially protrude outwardly from the outer ring such that at least one of the rolling elements therein axially protrudes outwardly from the outer ring, when viewed in cross section, a single outer edge of the at least one of the rolling elements is partially contacted and guided by the outer ring and is partially axially outside of the outer ring, the inner ring being located on a shaft, the outer ring being an outermost ring of the spherical roller bearing and being angularly rotatable relative to the inner ring.

13. The spherical roller bearing according to claim 12, wherein the outer ring is axially enlarged with respect to the inner ring by less than twenty percent (20%).

14. The spherical roller bearing according to claim 12, wherein the outer ring is axially enlarged with respect to the inner ring by less than ten percent (10%).

* * * * *